United States Patent [19]

Buschfeld

[11] 4,045,391

[45] Aug. 30, 1977

[54] PROCESS FOR PREPARING LOW VISCOSITY FATTY ACID-MODIFIED POLYESTERS

[75] Inventor: Adolf Buschfeld, Alpen, Germany

[73] Assignee: Deutsche Texaco Aktiengesellschaft, Hamburg, Germany

[21] Appl. No.: 658,545

[22] Filed: Feb. 17, 1976

[30] Foreign Application Priority Data

Feb. 25, 1975 Germany .............................. 2507985

[51] Int. Cl.$^2$ ................................................ C09D 3/64
[52] U.S. Cl. ............................. 260/22 EP; 260/18 PF; 260/22 M
[58] Field of Search ............ 260/18 PF, 22 EP, 22 M

[56] References Cited

U.S. PATENT DOCUMENTS

| | | | |
|---|---|---|---|
| 3,268,483 | 8/1966 | Klootwijk et al. | 260/22 M |
| 3,275,583 | 9/1966 | Kloos | 260/22 M |
| 3,277,035 | 10/1966 | Vegter et al. | 260/22 M |
| 3,332,898 | 7/1967 | Kloos | 260/22 EP |
| 3,374,208 | 3/1968 | Seiner et al. | 260/22 EP |
| 3,650,997 | 3/1972 | Weisfeld et al. | 260/22 EP |

*Primary Examiner*—Ronald W. Griffin
*Attorney, Agent, or Firm*—Walter D. Hunter; Carl G. Ries; Thomas H. Whaley

[57] ABSTRACT

In contrast to the known alkyd resins (fatty acid-modified polyesters) produced by way of esterification reaction, the alkyd resins according to this invention are produced by way of successive addition reactions. As a result, the structure and the chain length of the molecules can be predetermined, and the products obtained consist of uniform polyester molecules. Such products have viscosities lower than that of the known alkyd resins, thereby permitting the production of baking varnish systems comprising a low solvent content.

20 Claims, No Drawings

PROCESS FOR PREPARING LOW VISCOSITY FATTY ACID-MODIFIED POLYESTERS

BACKGROUND OF THE INVENTION

1. Field of the Invention

The present invention relates to a process for preparing low viscosity fatty acid-modified polyesters of uniform molecule structure for use in baking varnish systems of low solvent content.

2. Description of the Prior Art

Most baking varnish systems employed in practice are derived from fatty acid-modified polyesters (alkyd resins) and amino, phenolic, and acrylic resins or polyisocyanates. These baking varnish systems generally have a solids content of from about 50 to 55 percent, the balance being organic solvents. Baking these varnishes requires considerable amounts of heat in the evaporation step. Expensive technical equipment must be provided and substantial processing costs are incurred when recovering, or disposing of the solvents because they cannot, with respect to environmental protection, be simply expelled into the open air. For these reasons every effort has been made in the past to eliminate the organic solvents completely, or at least partially. For instance, water-soluble alkyd resins were developed. These alkyd resins, however, suffer from a serious disadvantage in that they require amines detrimental to environmental in the neutralization step and organic solvents, as well, and they are difficult to process. Attempts have also been made to provide a baking varnish system free from solvent which resulted in powder resins. The technique of applying thin layers, of obtaining the desired color shades as well as changing to other hues, when employing these lacquer resin films still presents difficulties so that, even today, they are used in only a limited field of application. A further disadvantage when employing powder resins, is the very high cost of investment for the powder spray coating means. Today attempts are being made to utilize the so-called low solvent baking varnish systems, i.e., systems having low solvent content. Such varnish systems are processed in the same manner as the conventionally used, solvent-rich lacquer systems. In such low solvent systems which contain from 70 to 80 percent less solvent than the conventional solvent-rich lacquer systems, low viscosity fatty acid-modified polyesters (alkyd resins) having molecular weights from 800 to 2000 are employed. Such fatty acid-modified polyesters are described in German Offenlegungsschrift Nos. 2,253,325 and 2,019,282. The alkyd resins employed in the past have high viscosities and thus require large amounts of solvent because the range of the molecular weights is very broad as a result of the equilibrium conditions encountered in the production of the alkyd resins by esterification reactions. The molecular sizes range from ester monomers to materials which are slightly gelated. Attempts have been made to narrow the range of the molecular weights of the esters by varying charge materials, amounts and esterification conditions but because of the adjusting of the equilibrium in the esterification reactions, fatty acid-modified polyester molecules of the same molecular weights cannot be obtained. One of the problems associated with the preparation of alkyd resins according to the aforementioned Offenlegungsschriften and according to Offenlegungsschrift Nos. 2,504,550 and 2,410,512 is that they are prepared from oligomer mixtures derived from molecules of various chain lengths and structures as well as being dependent on the selected mole ratio of polyhydric alcohol to polycarboxylic acid or monocarboxylic acid and on the grade of esterification, as well, and the finished resins contain relatively high amounts of non-reacted poly-alcohol and of monocarboxylic or dicarboxylic acids which adversely affect the resistance to scraping, to chemicals, to solvents, and to weather, of the lacquer films produced thereby.

It is the object of the invention to provide a process for preparing low viscosity fatty acid-modified polyesters (alkyd resins) with all molecules being substantially of the same structure and of the same chain length in order to obtain, e.g., in combination with amino resins, phenolic resins, acrylic resins, or polyisocyanates, low solvent baking varnishes of improved properties.

SUMMARY OF THE INVENTION

The process according to the invention comprises the following stages conducted at elevated temperatures:

STAGE 1 — Monocarboxylic acid glycide esters are added to the polycarboxylic acids or ester polycarboxylic acids to form polyhydric ester alcohols.

STAGE 2 — Polycarboxylic acid anhydrides are added to the formed polyhydric ester alcohols of Stage 1, STAGE 3 — Alkylene oxides or epoxyalkanols are added to the formed ester polycarboxylic acids of Stage 2, or the ester polycarboxylic acids are monoesterified with a high excess of polyhydric alcohols to yield a low-viscosity, fatty acid-modified polyester, and STAGE 4 — Optionally, polycarboxylic anhydrides are added to the product of Stage 3.

If longer ester chains of specific size are desired, this may be achieved in Stage 2 by alternately adding polycarboxylic anhydrides and monocarboxylic acid glycide esters. In the prior art, fatty acid-modified polyesters (alkyd resins) were produced primarily by way of esterification reaction, i.e., by means of a condensation, wherein the position of equilibrium is of decisive significance to the final product. In contradiction thereto, according to this invention, the polyesters are prepared with the possible exception of Stage 3 by way of addition reactions in which the equilibrium is almost entirely on the side of the esters to be formed so that there are no more charge materials left in the final product; and the polyester molecules present in the final product, are of a strictly predetermined structure and of a predetermined chain length. Due to their low viscosity, these fatty acid-modified polyesters (alkyd resins) permit the preparation of baking varnish systems using, for example, amino resins, phenolic resins, acrylic resins, or polyisocyanates which comprise a solids content of above 75 to 85 percent. These varnish systems which can be processed by conventional methods and at relatively low baking temperatures yield lacquer films having an excellent resistance to scraping, hardness, elasticity, toughness, resistance to chemicals and solvents, and having an excellent gloss, as well.

DESCRIPTION OF THE INVENTION

The process for preparing fatty acid modified polyesters according to this invention is carried out as follows:

In STAGE 1, equivalent amounts of, for instance, a polycarboxylic acid or an ester polycarboxylic acid and of a monocarboxylic acid glycide ester are combined and heated to a temperature preferably ranging between about 100° and 200° C until the acid number is about 1.

This results in the formation of a dihydric ester alcohol, i.e., an ester alcohol having two secondary hydroxyl groups, as shown by the following equation:

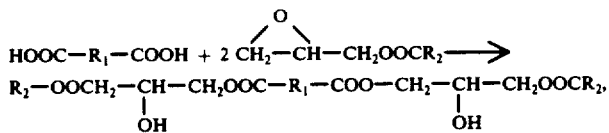

wherein $R_1$ is a saturated or unsaturated hydrocarbon chain having from 1 to 40 or more carbon atoms, or is an aromatic hydroaromatic, or heterocyclic ring, which may contain alkyl substituent groups having from 1 to 6 carbon atoms, or is an ester unit,
and $R_2$ is a saturated or unsaturated hydrocarbon chain, either straight or unbranched, having from 1 to 30 or more carbon atoms.

Suitable polycarboxylic acids are dicarboxylic or tricarboxylic acids such as, e.g., malonic acid, succinic acid, adipic acid, maleic acid, trimellitic acid, phthalic acid, etc. For ester polycarboxylic acids there can be employed in this invention, for example, the addition products of polycarboxylic acids of the type mentioned above added to polyols having from about 2 to about 20 carbon atoms as exemplified by propylene glycol, hexane diol, glycerol, trimethylol propane, etc.

Monocarboxylic acid glycide esters suitable for use in the process of the invention have the formula:

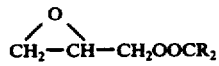

wherein $R_2$ is alkyl of from 1 to 30 or more carbon atoms as exemplified by methyl, ethyl, propyl, hexyl, lauryl, cetyl, oleyl, etc. Especially preferred is the glycide ester of branched monocarboxylic acids. Included within the definition of "branched monocarboxylic acids" are technical mixtures of synthetic, saturated, aliphatic substantially tertiary monocarboxylic acids having from 6 to 20 carbon atoms, of the general formula:

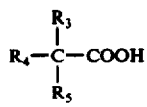

wherein $R_3$, $R_4$, and $R_5$ are alkyl groups. In general, two of $R_3$, $R_4$ and $R_5$ are lower alkyl groups and one is a higher alkyl group.

In Stage 2, the secondary hydroxyl groups of the dihydric ester alcohol formed in Stage 1, are esterified in an addition reaction at temperatures preferably of from 100° to 200° C by adding an equivalent amount of a polycarboxylic anhydride, e.g., a dicarboxylic acid. If desired, the said ester chains can be conveniently lengthened at this stage by adding alternately equivalent amounts of a monocarboxylic acid glycide ester and of dicarboxylic anhydride, etc. until the desired molecule size of the ester dicarboxylic acid is achieved. Any of the anhydrides of polycarboxylic acids may be utilized in this step, such as, e.g., maleic anhydride, phthalic anhydride, succinic anhydride, trimellitic anhydride, or pyromellitic anhydride, etc. The properties of the ester product formed will vary with the acid anhydride employed.

Subsequently, in Stage 3, either alkylene oxide or epoxyalkanols, respectively, are added to the ester polycarboxylic acids, or the ester polycarboxylic acids are esterified at temperatures ranging from about 150° to 250° C. with a high excess of polyhydric alcohols, such as diols, boiling in the lowest possible range. Particularly suitable alkylene oxides are ethylene oxide, propylene oxide, butylene oxide, and mixtures thereof. Epxoyalkanols useful in the process of this invention have the formula:

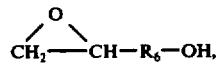

wherein $R_6$ is alkylene of from 1 to 6 inclusive carbon atoms. Ethylene glycol is the especially preferred diol; however, also higher diols such as propylene glycol, butylene glycol, 2-methyl-propane-diol-1.3, etc., may be employed in the esterification step.

The remaining portion of the diols employed in excess can either be left as solvent in the system, or it can be removed by distillation under mild conditions, preferably in vacuo. The amounts of the alkylene oxides or of the epoxyalkanols, or of the diols added, correspond to the desired acid numbers and/or hydroxyl numbers of the final products. The esterification reaction in Stages 1, 2, and 4 is carried out at or slightly above ring decomposition temperature of the glycide ester or of the polycarboxylic acid anhydride, respectively.

It is, however, also possible to react the fatty acid-modified ester-dicarboxylic acids formed in Stage 2, with an equivalent amount of an alkylene oxide or epoxyalkanol, respectively, or with a high excess of a diol such that an ester diol is formed to which subsequently in Stage 4, additional polycarboxylic anhydride is added until the desired acid and hydroxyl numbers are obtained.

Of course, working with equivalent amounts in one or more stages is not always required; for instance, one of the addition reaction components may be employed in little surplus amounts, e.g., from 0.1 to 20 mole percent. If polycarboxylic acids or ester polycarboxylic acids, respectively, having more than two carboxyl groups, are employed a desired portion of said carboxylic groups may be left unreacted which later on during the baking stage serves as catalyst in the cross-linking reaction taking place between the polyester of the invention and the amino resin, phenolic resin, acrylic resin, or polyisocyanate.

Using the process of the invention, products can be prepared in which the structure and size of the molecules are precisely defined. In addition, the products contain almost no charge materials or low molecular portions that would adversely affect the properties of the lacquer films.

The following Examples illustrate the process of the invention and are to be considered not limitative.

EXAMPLE 1

490 parts by weight of the glycide ester of branched monocarboxylic acids having an average carbon number of 13* (2 moles) are added to 146 parts by weight of adipic acid (1 mole) at a temperature in the range of from 150° to 160° C. Subsequently, at the same temperature, 296 parts by weight of phthalic anhydride (2 moles) are added to the formed dihydric ester alcohol. As soon as the theoretical acid number of 120 is obtained, the formed ester dicarboxylic acid is esterified, at a temperature of 200° C with 496 parts by weight (8 moles) of ethylene glycol. After completion of esterification reaction, the excess ethylene glycol is distilled under reduced pressure (4 Torr).

A fatty acid-modified polyester having a viscosity of 170 seconds (basis 90% polyester solution in butylacetate, measured in a 4 mm DIN flow cup at 20° C according to German Industrial Standard (DIN) No. 53 211) is obtained.

A white varnish prepared therefrom and being composed of 149 parts by weight of a 90% polyester, 46 parts by weight of a 98% melamine resin (Dynomin M 100(R), a product sold by the company of Dynamit Nobel,), 108 parts by weight of titanium dioxide, 9 parts by weight of a 10% p-toluene sulfonic acid solution, and 30 parts by weight of butylglycol, and having a solids content of 84 percent, is baked for 30 minutes at 120° C to yield a 60μ film.

This film has the following characteristics:

| | | | |
|---|---|---|---|
| 1. | Gloss (acc. to Gardner at 20°) | 92 | percent |
| 2. | Pendulum hardness (acc. to Koenig DIN No. 53157) | 102 | seconds |
| 3. | Erichsen deepening (DIN No. 50101) | >10 | mm |
| 4. | Impact deepening (DIN No. 53156) | 7 | mm |

EXAMPLE 2

296 parts by weight of phthalic anhydride (2 moles) are added, at a temperature of 150° C, to 118 parts by weight of hexanediol-1,6 (1 mole).

The formed ester dicarboxylic acid is now reacted in Stage 1, at a temperature of from 150° to 160° C, with 490 parts by weight (2 moles) of glycide ester of branched monocarboxylic acids having an average carbon number of about 13* to form an ester diol, and subsequently in Stage 2, at the same temperature, with 296 parts by weight of phthalic anhydride (2 moles) to form the fatty acid-modified ester dicarboxylic acid. As soon as the theoretical acid number of 95 is obtained, said ester dicarboxylic acid is esterified at a temperature of 200° C with 496 parts by weight (8 moles) of ethylene glycol, and the excess diol is distilled off under the reduced pressure of approximately 4 Torr.

* Cordura E 10, a product sold by Shell

The linear polyester obtained has a viscosity of 205 seconds (basis 90% polyester solution in butylacetate, measured in a 4 mm DIN flow cup acc. to DIN No. 53211).

A white varnish ready for use (composition and baking conditions as of Example 1) has the following properties:

| | | | |
|---|---|---|---|
| 1. | Gloss (acc. to Gardner at 20°) | 92 | percent |
| 2. | Pendulum hardness (acc. to Koenig) | 115 | seconds |
| 3. | Erichsen deepening | >10 | mm |
| 4. | Impact deepening | 7 | mm |

EXAMPLE 3

At a temperature of 150° C, 444 parts by weight of phthalic anhydride (3 moles) are added to 134 parts by weight of trimethylolpropane (1 mole) and subsequently, at the same temperature, 735 parts by weight of the glycide ester of branched monocarboxylic acids having an average carbon number of about 13* (3 moles) are added to the resultant tricarboxylic acid to yield the corresponding trihydric ester alcohol. Subsequently, in Stage 2, at temperatures of up to 200° C, 444 parts by weight of phthalic anhydride are added to the trihydric ester alcohol thereby forming the corresponding ester tricarboxylic acid. When the acid number is 98, the tricarboxylic acid is esterified with 744 parts by weight of ethylene glycol (12 moles), at a temperature of up to 200° C. After completion of said esterification reaction, the excess ethylene glycol is distilled off in a vacuo until the pressure has decreased to 4 Torr. The temperature is lowered to 150° C and 103.5 parts by weight of phthalic anhydride (0.7 mole) are added to the fatty acid-modified trihydric ester alcohol obtained. The resulting polyester has an acid number of 20.5 and a viscosity of 255 seconds (basis 90% polyester solution in butylacetate, measured in a 4 mm DIN flow cup at 20° C acc. to DIN No. 53211).

* Cordura E 10, a product sold by Shell

A ready-for-use white varnish produced from said fatty acid-modified polyester, whose composition differs from that of Example 1 by omitting p-toluene sulfonic acid solution and by the amount of butyl glycol employed which is increased by 10 parts by weight, has a solids content of 82 percent. The 60μ lacquer film baked for 30 minutes at a temperature of 120° C. has the following properties:

| | | | |
|---|---|---|---|
| 1. | Gloss (acc. to Gardner at 20°) | 96 | percent |
| 2. | Pendulum hardness (acc. to Koenig) | 135 | seconds |
| 3. | Erichsen deepening | 9.6 | mm |
| 4. | Impact deepening | 5 | mm |

EXAMPLE 4

At a temperature of 150° C. 444 parts by weight of phthalic anhydride (3 moles) are added to 134 parts by weight of trimethylolpropane (1 mole) and subsequently, at the same temperature, 735 parts by weight of the glycide ester of branched monocarboxylic acids having an average carbon number of about 13* (3 moles) are added to the resultant tricarboxylic acid to yield the corresponding trihydric alcohol.

* Cordura E 10, a product sold by Shell

Subsequently, in Stage 2, 444 parts by weight of phthalic anhydride (3 moles) are added to said trihydric ester alcohol thereby forming the corresponding ester tricarboxylic acid. When an acid number of 98 is obtained, the temperature is lowered to 120° C. and 110 parts by weight of ethylene oxide (2.5 moles) are added to said tricarboxylic acid. The resultant polyester has an acid number of 15.5 and a viscosity of 195 seconds (basis 90% polyester solution in butylacetate, measured in a 4 mm DIN flow cup at 20° according to DIN 53211).

A white varnish prepared according to Example 1 but without sulfonic acid solution, and baked for 30 minutes at 120° C, has the following properties:

| | | | |
|---|---|---|---|
| 1. | Gloss (acc. to Gardner at 20°) | 95 | percent |

| | |
|---|---|
| 2. Pendulum hardness (acc. to Koenig) | 127 seconds |
| 3. Erichsen deepening | 10 mm |
| 4. Impact deepening | 5 mm |

EXAMPLE 5

At a temperature of from 150° to 160° C, 490 parts by weight of the glycide ester of branched monocarboxylic acids (2 moles) having an average carbon number of about 13* are added to 146 parts by weight of adipic acid (1 mole). Subsequently, at the same temperature, 296 parts by weight of phthalic anhydride (2 moles) are added to the formed dihydric ester alcohol. When the acid number of 120 is reached the ester chain length is extended by adding 490 parts by weight of the same glycide ester of branched monocarboxylic acids previously added above (2 moles) to the formed ester dicarboxylic acid to give the corresponding ester diol to which 296 parts by weight of phthalic acid (2 moles) are then added. As soon as the acid number is 65, the temperature is lowered to 130° C, and 88 parts by weight of ehtylene oxide are added to the formed ester dicarboxylic acid to yield the corresponding ester diol.

* Cordura E 10, a product sold by Shell

A low viscosity polyester having a viscosity of 160 seconds is obtained (basis 90% polyester solution in butylacetate, measured in a 4 mm DIN flow cup at 20° according to DIN No. 53211). A white varnish prepared according to Example 1 and baked for 30 minutes at 120° C has the following properties:

| | | |
|---|---|---|
| 1. Gloss (acc. to Gardner at 20°) | 96 | percent |
| 2. Pendulum hardness (acc. to Koenig) | 91 | seconds |
| 3. Erichsen deepening | 10 | mm |
| 4. Impact deepening | 7 | mm |

EXAMPLE 6

At a temperature of from 150° to 160° C, 490 parts by weight of the glycide ester of branched monocarboxylic acids having an average carbon number of about 13* (2 moles) are added to 146 parts by weight of adipic acid (1 mole). Subsequently, at the same temperature, 148 parts by weight of phthalic anhydride (1 mole) and 192 parts by weight of trimellitic anhydride (1 mole) are added to the formed ester diol, thereby forming the ester tricarboxylic acid. When the acid number reaches 173, the said tricarboxylic acid is esterified with 744 parts by weight of ethylene glycol (12 moles), at temperatures of up to 200° C. After completion of said esterification reaction, the excess of ethylene glycol is distilled off in vacuo until the pressure has decreased to 4 Torr. The polyester obtained has a viscosity of 220 seconds (basis (90% polyester solution in butylacetate, measured in a 4 mm DIN flow cup at 20° acc. to DIN No. 53211).

* Cordura E 10, a product sold by Shell

The white varnish prepared according to Example 1 and baked for 30 minutes at 120° C has the following properties:

| | | |
|---|---|---|
| 1. Gloss (acc. to Gardner at 20°) | 96 | percent |
| 2. Pendulum hardness (acc. to Koenig) | 145 | seconds |
| 3. Erichsen deepening | 9.8 | mm |
| 4. Impact deepening | 5 | mm |

EXAMPLE 7

At a temperature of 150° C, 118 parts by weight of hexanediol-1,6 (1 mole) are reacted with 325.6 parts by weight (2.2 moles) of phthalic anhdride after which there was added to the formed ester dicarboxylic acid at a temperature of 170° C, 490 parts by weight (2 moles) of the glycide ester of branched monocarboxylic acids having a carbon number of about 13*. The resultant product has an acid number of 12. At the same temperature 296 parts by weight (2 moles) of phthalic anhydride, 490 parts by weight (2 moles) of the same glycide ester of branched monocarboxylic acids as previously added, 296 parts by weight (2 moles) of phthalic anhydride, 490 parts by weight (2 moles) of the same glycide ester of branched monocarboxylic acids as previously added and finally, 266.4 parts by weight (1.8 moles) of phthalic anhydride are successively added to the formed ester diol whereby subsequent to said phthalic anhydride additions in the succession as above the respective acid numbers are 110, 67, and 40.5. Then 372 parts by weight (6 moles) of ethylene glycol are added to the formed ester dicarboxylic acid. In a subsequent esterification reaction at 200° C, 109 parts by weight of an ethylene glycol/reaction water mixture was distilled off.

* Cordura E 10, a product sold by Shell

The formed linear polyester has a viscosity of 103 seconds (80% polyester solution in butyl acetate, measured in a 4 mm DIN flow cup according to DIN No. 53211).

A white varnish prepared therefrom (composition and baking conditions the same as of Example 1) exhibited the following properties;

| | | |
|---|---|---|
| 1. Gloss (acc. to Gardner at 20°) | 95 | percent |
| 2. Pendulum hardness (acc. to Koenig) | 102 | seconds |
| 3. Erichsen deepening | 10 | mm |
| 4. Impact deepening | 7 | mm |

What is claimed is:

1. A multi-stage process for preparing low viscosity, fatty acid-modified polyesters for use in varnish systems of low solvent content which comprises the following stages conducted in sequential order at elevated temperatures:
    a. reacting a monocarboxylic acid glycide ester with a compound selected from the group consisting of a polycarboxylic acid and an ester polycarboxylic acid to form a polyhydric ester alcohol,
    b. reacting the said polyhydric ester alcohol with a polycarboxylic acid anhydride to form an ester polycarboxylic acid,
    c. reacting the said ester polycarboxylic acid formed in (b) with a material selected from the group consisting of an alkylene oxide, an epoxyalkanol and a polyhydric alcohol to form the fatty-acid modified polyester product.

2. The process of claim 1 wherein in (c) the ester polycarboxylic acid formed in (b) is reacted with a large excess of polyhydric alcohol and the unreacted portion of the said polyhydric alcohol is distilled from the resulting product under mild conditions.

3. The process of claim 1 wherein in (a) the polycarboxylic acid is selected from the group consisting of malonic acid, succinic acid, adipic acid, maleic acid, trimellitic acid and phthalic acid.

4. The process of claim 1 wherein in (a) the said monocarboxylic acid glycide ester has the formula:

wherein $R_2$ is selected from the group consisting of a hydrocarbon chain having from 1 to about 30 carbon atoms and the radical

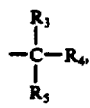

wherein $R_3$, $R_4$ and $R_5$ are alkyl groups whose sum ranges from 6 to 20 carbon atoms.

5. The process of claim 1 wherein (a) and (b) are carried out at a temperature of about 100° to 200° C; (c) is carried out at a temperature of about 150° to 250° C and (d) is carried out at a temperature of about 100° to 200° C.

6. The process of claim 1 wherein in (a) the said ester polycarboxylic acid is the ester formed by reacting a polyhydric alcohol selected from the group consisting of ethylene glycol, propylene glycol, butylene glycol, hexane diol, 2-methyl-propane diol-1,3, neopentyl glycol, glycerol, trimethylol ethane and -propane and pentaerithritol with a polycarboxylic acid anhydride.

7. The process of claim 1 wherein in (a) the said polycarboxylic acid is a compound of the formula:

$$HOOC - R_1 - COOH$$

wherein $R_1$ is selected from the group consisting of:
I. a hydrocarbon chain having 1 to about 40 carbon atoms,
II. an aromatic, hydroaromatic or heterocyclic ring which may contain alkyl substituent groups having from 1 to 6 carbon atoms,
III. an ester unit.

8. The process of claim 1 wherein in (a) the said ester polycarboxylic acid is the ester formed by reacting a polycarboxylic acid anhydride with a polyhydric alcohol having from 2 to 6 inclusive hydroxyl groups and from 2 to about 20 carbon atoms.

9. The process of claim 1 wherein in (b) the said polycarboxylic acid anhydride is independently selected from the group consisting of maleic anhydride, phthalic anhydride, succinic anhydride, trimellitic anhydride and pyromellitic anhydride.

10. The process of claim 1 wherein in (c) the alkylene oxide is selected from the group consisting of ethylene oxide, propylene oxide and butylene oxide.

11. The process of claim 1 wherein in (c) the said epoxyalkanol has the formula:

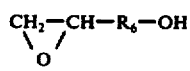

wherein $R_6$ is alkylene of from 1 to 6 carbon atoms.

12. The process of claim 1 wherein in (c) the said polyhydric alcohol has the formula:

$$R_7(OH)_n$$

wherein $R_7$ is alkylene of from 2 to 20 carbon atoms and $n = 2 - 3$.

13. The process of claim 1 wherein in (a) this said monocarboxylic acid glycide ester is the glycide ester of branched monocarboxylic acids having an average carbon length of about 12 – 14 and in (a) the said compound is an ester polycarboxylic acid formed by reacting phthalic anhydride and hexandiol-1,6; in (b) the said polycarboxylic acid anhydride is phthalic anhydride and (c) the said material is ethylene glycol.

14. The process of claim 1 wherein in (a) this said monocarboxylic acid glycide ester is glycide ester of branched monocarboxylic acids having an average carbon number of about 12 – 14 and the said compound is an ester formed by reacting phthalic anhydride and trimethylol propane; in (b) the said polycarboxylic acid anhydride is phthalic anhydride; in (c) the said material is ethylene glycol.

15. The process of claim 1 wherein in (a) the said monocarboxylic acid glycide ester is glycide ester of branched monocarboxylic acids having an average carbon number of about 12 – 14 and the said compound is adipic acid; in (b) the said polycarboxylic acid anhydride employed is a mixture of phthalic anhydride and trimellitic anhydride and in (c) the said material is ethylene glycol.

16. The process of claim 1, wherein in all stages the reaction components are employed in equivalent amounts.

17. The process of claim 1, wherein in one or more stages one of the reaction components is employed in surplus amounts of as little as up to 20 mole percent.

18. The process of claim 1 wherein the said fatty-acid modified polyester product formed in (c) is reacted with a polycarboxylic acid anhydride.

19. The process of claim 1 wherein after stage (b) and prior to stage (c) the chain length of the ester polycarboxylic acid of (b) is extended by alternately reacting a monocarboxylic acid glycide ester and a polycarboxylic acid anhydride.

20. The process of claim 19 wherein in (a) the said monocarboxylic acid glycide ester is the glycol ester of branched monocarboxylic acids having an average carbon number of about 12 to 14 and the said compound is the addition product formed by trimethylol propane and phthalic anhydride; in (b) the polyhydric ester alcohol formed in (a) is first reacted with phthalic anhydride then with an additional quantity of the glycide ester of branched monocarboxylic acids having an average carbon number of about 12 – 14 after which the resulting product is further reacted with an additional quantity of phthalic acid; and in (c) the ester tricarboxylic acid formed in (b) is further reacted with ethylene glycol; and in (d) maleic anhydride is added to the polyester formed in (c).

* * * * *